United States Patent [19]

Murphy

[11] Patent Number: 4,483,323
[45] Date of Patent: Nov. 20, 1984

[54] TENSIONING DEVICE FOR A STRETCHED MEMBRANE COLLECTOR

[75] Inventor: Lawrence M. Murphy, Lakewood, Colo.

[73] Assignee: The United States of America as represented by the United States Department of Energy, Washington, D.C.

[21] Appl. No.: 440,205

[22] Filed: Nov. 8, 1982

[51] Int. Cl.³ .............................................. F24J 3/02
[52] U.S. Cl. .................................... 126/438; 350/631
[58] Field of Search .................. 126/438, 439; 350/17, 350/100, 101, 104, 107, 108, 288, 289, 306, 309

[56] References Cited

U.S. PATENT DOCUMENTS

| | | |
|---|---|---|
| 3,254,207 | 5/1966 | Lowell .............................. 350/292 X |
| 3,635,547 | 1/1972 | Rushing et al. . |
| 3,781,095 | 12/1973 | Rushing et al. . |
| 3,843,238 | 10/1974 | Rushing et al. . |
| 3,973,834 | 8/1976 | Penn et al. . |
| 4,035,065 | 7/1977 | Fletcher . |
| 4,209,236 | 6/1980 | Horton . |
| 4,251,135 | 2/1981 | Stone . |
| 4,358,183 | 11/1982 | Whiteford ........................... 350/288 |
| 4,382,657 | 5/1983 | Lemaitre ............................. 350/295 |

OTHER PUBLICATIONS

General Electric, Solar Central Receiver Prototype Heliostat Phase I, Final Technical Report, Sep. 30, 1977–Jun. 1980, (General Electric Energy Systems Program Department, Schenectady, N.Y., 1978).

Primary Examiner—Larry Jones
Attorney, Agent, or Firm—Kenneth L. Richardson; Hugh W. Glenn; Michael F. Esposito

[57] ABSTRACT

Disclosed is a solar concentrating collector comprising an elastic membrane member for concentrating sunlight, a frame for holding the membrane member in plane and in tension, and a tensioning means for varying the tension of the membrane member. The tensioning means is disposed at the frame and is adapted to releasably attach the membrane member thereto. The tensioning means is also adapted to uniformly and symmetrically subject the membrane member to stretching forces such that membrane stresses produced thereby are distributed uniformly over a thickness of the membrane member and reciprocal twisting moments are substantially prevented from acting about said frame.

15 Claims, 2 Drawing Figures

TENSIONING DEVICE FOR A STRETCHED MEMBRANE COLLECTOR

CONTRACTUAL ORIGIN OF THE INVENTION

The United States Government has rights in this invention pursuant to Contract No. EG-77-C-01-4042 between the U.S. Department of Energy and the Midwest Research Institute.

BACKGROUND OF THE INVENTION

1. Field of the Invention

The present invention relates generally to solar collectors, and more particularly to a tensioning device for a stretched membrane collector.

2. Description of the Prior Art

Recent developments in the solar collector include a trend toward manufacturing reflectors for concentrating solar collectors with thin flexible lightweight reflector materials. Examples of such lightweight reflector materials are thin metallic sheets of steel or aluminum which are frequently referred to as foils. Collectors manufactured from these materials are commonly referred to as stretched membrane solar collectors. Generally speaking, a solar collector consists of a reflector and a metal-constructed reflector support frame. The reflector is typically in a form of a mirror or plurality of mirror segments.

Individual solar collectors are frequently employed in an array to concentrate solar radiation severalfold by reflecting and focusing the solar radiation onto an absorber/receiver. Solar radiation is commonly known as sunlight and, generally speaking, concerns electromagnetic radiation emitted by the sun. The absorber/receiver which may be of a cavity-type is positioned at the focal area of the array so as to absorb maximum heat energy.

The focal area, broadly speaking, concerns a point or region to which the collector reflects all of the incident sun radiation. The solar energy flux received and absorbed by the receiver/absorber is usually carried away by a suitable heat transfer fluid to either operate a thermodynamic heat engine or to provide process heat. Solar flux generally means energy flux transmitted from the sun, which is in the form of electromagnetic radiation.

The trend toward producing lightweight solar collectors is dictated in part by a high manufacturing cost of mirrored glass/metal-type reflector collectors. This trend is also dictated in part by the heavyweight of mirrored glass/metal-type heliostat reflector panels and their support structures. A heliostat may be simply defined as a tracking mirror. To continue, the reflector panels are typically fabricated from thick heavy metal, glass and composite materials in order to meet strength and rigidity requirements imposed by the heliostat performance. Speaking more specifically, such strength and rigidity is frequently required in order to give the panel the capacity to withstand environmental loads without undergoing warping, buckling or fracturing which eventually could lead to failure, as well as being required to maintain optical accuracy. Examples of such environmental loads are gravity loads, wind loads, and ice/snow loads.

Unfortunately, the heavy deadweight load of the reflector and the reflector suport frame frequently produces stresses and deformations in the heliostat which undesirably add to the harmful stresses produced by environmental loads. Additionally, the use of heavy structural elements and metal materials to add sufficient strength and rigidity so that the heliostats can sustain such loads is one major reason for their high manufacturing cost.

In addressing the disadvantages associated with the heavyweight collectors by producing collectors which employ substantially thinner and lighter weight manufacturing materials, a problem has developed in fabricating lightweight reflector support frames which can safely withstand stresses due primarily to twisting moments normally produced during the tensioning operation. In the tensioning operation, the reflector membrane is typically tensioned to provide a desired reflector surface contour. Unfortunately, however, some of the devices heretofore employed to tension the reflector membrane tension it by loading the reflector support frame substantially eccentrically.

It will be noted that tensioning of the membrane is usually required in order to provide an adequate focal point or image of the sun at the cavity of the absorber/receiver. A tensioned surface reflector will have a focal length which is a function of the reflector elevation angle and surface tension. The characteristics of a tensioned surface with respect to the associated focal point are normally used to enhance collector performance by reducing the size of the image at the receiver and therefore the amount of energy spillover.

Additionally, a problem has developed in providing lightweight stretched collector with variable or adjustable focusing capabilities, such that the collector can be used to produce various concentration ratios to meet specific collector site requirements. Concentration ratios concern the ratio of the intensity of solar light impinging on the absorber to that of the solar light impinging on the collective surface of the collector. Notably, these ratios may be as small as one for no concentration to as high as several thousand.

To cope with the aforesaid problems, the reflector surfaces of some solar collectors have been designed by tensioning a sheet of aluminized Mylar over a plurality of elongated supporting members. The supporting members function to impart a caternary configuration to the aluminized sheet. A prior art patent relating to such a design is U.S. patent Ser. No. 4,173,397. Unfortunately, however, this prior art design as well as others have suffered from one or more shortcomings. For example, this earlier design is unduly complex, comprises a number of component parts, and its focus is not easily controllable.

Some prior art designs have stretched a sheet of aluminized Mylar over the top of a hollow cylinder and reduced the pressure therein between to provide a desired surface configuration. An example of this design is disclosed in U.S. patent Ser. No. 4,288,146. However, unfortunately, this design may result in a proneness to develop leaks, and eventual changes in the pressure within the cylinder leads to undesirable and irreversible degradation of the collector focus. It will be noted that the use of a vacuum pump to maintain the desired pressure has to some degree been partly helpful in reducing some aspects of the problem with pressure leakage. However, a vacuum pump is an additional cost element and is power consuming.

Some prior art designs use flat surface-type collectors. In flat surface-type collectors, the reflected sun radiation is aimed rather than focused at the absorber/ receiver cavity. Flat surface-type collectors, however, when employed in applications where high intensity ratios are desired, often produce an unacceptably enlarged focal region at the receiver as a consequence of a spreading of the reflected incident sunlight beam, as well as producing a related unwanted drop in optical efficiency. Optical efficiency generally concerns a measurement of a fraction of the sun energy that actually reaches the absorber/receiver cavity.

SUMMARY OF THE INVENTION

Against the foregoing background, it is a general object of the present invention to provide a tensioning device for a lightweight stretched membrane solar collector which overcomes many of the aforedescribed shortcomings and disadvantages of the prior art lightweight solar collectors.

It is another general object to provide a tensioning device for a lightweight stretched membrane solar collector which in certain embodiments uses only inexpensive readily available materials and components that can be easily and cheaply manufactured.

It is a specific object to provide a tensioning device for a lightweight stretched membrane solar collector which tensions the membrane to a desired configuration while substantially minimizing twisting moments produced by tension forces at the reflector support frame.

It is another specific object to provide a tensioning device for adjustably tensioning lightweight stretched membrane solar collectors.

It is yet another specific object to optimize the collector support frame for minimum weight within design constraints ordinarily required to tension the reflector surface of the collector for most normally anticipated collector applications.

The above objects, as well as still further objects and advantages, are attained by the present invention, which may be described briefly as a solar collector comprising an elastic membrane member for concentrating sunlight, a frame for holding the membrane member in plane and in tension, and a tensioning means for varying the tension of the membrane member. The tensioning means is disposed at the frame and is adapted to releasably attach the membrane member thereto. The tensioning means uniformly and symmetrically subjects the membrane member to stretching forces such that membrane stresses produced thereby are distributed uniformly over a thickness of the membrane member and reciprocal twisting moments are substantially prevented from acting about the frame.

Additional objects, advantages, and novel features of the present invention will be set forth in part in the detailed description which follows, and in part will become apparent to those skilled in the art upon examination of the following description or upon practicing the invention. The objects and advantages of the invention may be realized and obtained by means of elements and a combination of elements particularly pointed out in the appended claims.

BRIEF DESCRIPTION OF THE DRAWINGS

The accompanying drawings, which are incorporated in and form a part of the specification illustrates preferred embodiments of the present invention and together with the description serve to explain the principles of the invention. In the drawings.

DETAILED DESCRIPTION OF THE PREFERRED EMBODIMENTS

Figure 1:
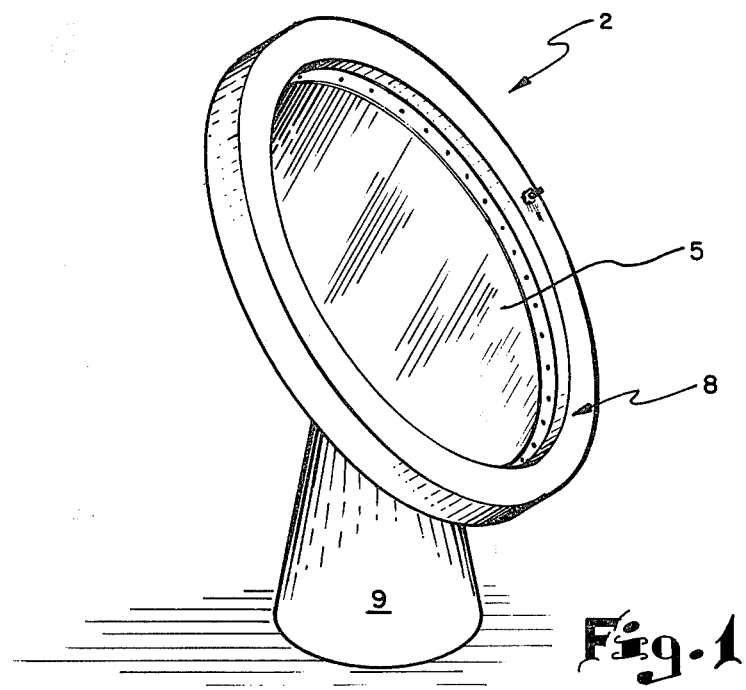
FIG. 1 is a perspective view of a lightweight stretched membrane solar collector employing a tensioning device that is constructed in accordance with principles of the invention.
Figure 2:
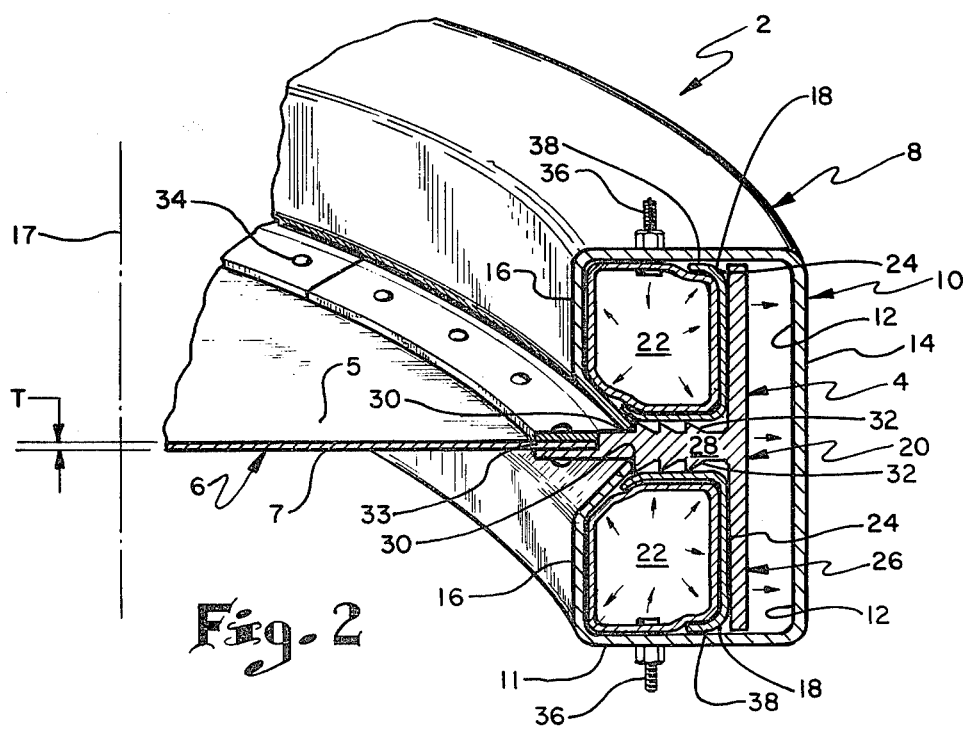
FIG. 2 is an enlarged, cross-sectional, perspective view illustrating the details of the tensioning device and reflector support frame of the lightweight stretched membrane solar collector of FIG. 1.

Referring to FIGS. 1 and 2, there is illustrated a lightweight stretched membrane solar collector 2 employing a tensioning device that is constructed in accordance with the invention. The tensioning device is generally denoted by the reference character 4. Generally speaking, collector 2, and thus tensioning device 4, may be employed in numerous applications where a reflector or collector surface is required to retrieve power from solar energy. An example of one such application is a central receiver system which, generally speaking, employs a field of collectors to concentrate solar radiation into an absorber/receiver to generate fairly large amounts of electrical power. Collector 2 generally includes a stretched composite membrane member 6, a membrane support frame 8, and tensioning device 4.

In the present instance, the composite membrane member 6 generally functions to provide tension in the collector surface 5. The membrane member 6 is suspended from the frame 8 through the tensioning device 4 such that the membrane 6 is planar, as well as being held in tension which will be more fully discussed hereinafter. The composite membrane member 6 includes an upper layer or film of a reflector material which serves as the collector surface 5 and a lower layer 7 of metal material which serves as a substrate for the reflector material.

The lower layer 7 may be formed from any number of fairly thin lightweight elastic reflector materials, such as for example, aluminum, steel foils or polymeric foils. The reflector surface 5 may also be formed from any number of well-known plastics which are capable of meeting the mechanical property requirements and optical performance requirements for satisfactory reflector surface operations. Aluminized polyesters and silvered polycarbonates are examples of such reflector surface materials. The reflector surface 5 can also be applied to the lower layer 7 with any number of well-known reflector surface forming techniques. Examples of such techniques are direct metallization techniques, mold-in-films techniques or surface sheet lamination techniques.

The frame 8 generally functions to support the membrane member 6, as well as to hold it in plane and in tension, as previously mentioned hereinbefore. It will be noted that the frame 8 is, in turn, connected to and supported by a pedestal 9. However, the details of the pedestal 9 and the connection of the pedestal 9 to the frame 8 are not fully described herein since they form no part of the present invention and they are well known in the collector art.

To continue, frame 8 is provided with a generally annular shape and is fabricated from a metal material, such as for example, structural steel or aluminum. The frame 8 also includes a circumferentially extending planar portion 10 which defines opposed inner and outer facing surfaces 12, 14.

The planar portion 10 is provided with a pair of transversely spaced circumferentially extending tongue members 16. Each one of the two tongue members 16 generally includes three segments. The first segment extends perpendicularly from the inner surface 12 of the planar portion 10 so as to project radially inward towards a central region 17 of the membrane member 6. The second segment is formed integrally with the first segment and extends therefrom so as to project in an axial direction. The third segment is integrally formed with the second segment and extends therefrom so as to project generally radially outwards away from the central region 17. Together the three segments, and thus tongue 16 define a circumferentially extending excess 18, and are clearly shown in FIG. 1.

Referring now to the tensioning device 4, the tensioning device 4 generally functions to couple the membrane 6 to the frame 8, as well as to provide a means for varying the tension of the membrane 6. The tensioning device 4 includes a radially movable piston 20, and an expander member 22.

The expander member 22 generally functions to impart intermittent radially outward movement of the piston 20 relative to the frame 8. The expander member 8, in the present instance, consists of a pair of inflatable watertight and airtight tubular-shaped bladders. The expander/bladder members 22 may be formed from any material suitable for holding air or liquid under pressure, such as for example a rubber material. Each expander/bladder member 22 is disposed within a corresponding one of the two recesses 18, such that a first portion thereof is in abutting engagement with the inside surface 12 of the tongue 16 and an inner surface 24 of the piston 20.

Referring now to the piston 20, the piston 20 is adapted to seat within the two recesses 18. It is noted that the piston 20 inclues a plurality of circumferentially extending segments 21. The segments 21 are formed in a manner to provide the piston 20 with a ring-type shape when the piston is seated within the recesses 18. The segments 21 function to allow the component members of the membrane member 6, and thus the membrane member 6 itself, to be effectively loaded in a radial direction, as will be more apparent hereinafter. Incidentally, it will be appreciated that a solid circular-type piston, in sharp contrast to the circular segmented piston 20 of the present invention, would support an applied radial load by circumferential loading in the solid piston itself, rather than primarily radially loading the membrane member 6 as is accomplished with the circular segmented piston 20.

To accomplish seating the piston 20 within the recesses 18, the piston 20 is provided with a first circumferentially extending planar or platen portion 26 having inner and outer opposed surfaces 24, 26. The piston 20 is seated within the recess 18 such that the outer platen surface 26 is adjacent the inner surface 12 of the planar portion 10 of the frame 8. The piston 20 is also provided with a circumferentially extending slide portion 28 which generally functions to releasably couple the membrane member 6 to the frame 8 and to assist the piston 20 in accomplishing radial movement.

The slide 28 extends generally perpendicularly from the inner plate surface 24 and projects in a radially inward direction so as to provide the piston 20 with a t-shaped configuration. By this t-shaped configuration, the slide 28 is positioned between the two radially circumferential passages 18, as is clearly shown in FIG. 2.

The slide 28 also includes axially facing opposed surfaces which define a segmented indexing means 32. The indexing means 32 extends rapidly inwardly and generally functions to assist in allowing the slide 28, and thus the piston 20, to intermittently move radially outward in a direction away from the central region 17 of the membrane member 6 in response to expansion of the expander 22, as will be more fully explained hereinafter.

The indexing means 32 in this instance consists of two pluralities of circumferentially extending teeth members, a different plurality of teeth members being disposed at each one of the two opposed side surfaces of the slide 28, as is clearly shown in FIG. 2. Each tooth of the indexing means 32 is evenly spaced in a radial direction from one another and projects generally vertically from the side of the slide 28 that it is associated with. Each one of the two plurality of teeth members is positioned so as to be in abutting engagement with a corresponding circumferentially extending peripheral edge or end portion 30 of the tongue 16.

Each tooth is further adopted to allow the expander 22 to give intermittent radially outward movement to the slide 28, and thus to the piston 20 relative to frame 8, by means of the edge portions 30 sequentially slidably engaging the teeth of the indexing means 32 in response to expansion of the expander bladder members 22. To facilitate the sliding movement of slide 28, each tooth is provided with a sloping ramp-like configuration, as is clearly shown in FIG. 2 and as will be more fully explained hereinbelow. Incidentally, it will be understood that the opposed side surfaces of the slide indexing means 28 are not limited to a construction with teeth, and may be fabricated with other suitable structures for adequately enabling the piston 20 to move intermittently radially outward, such as for example a knurled construction.

An inner facing outer edge portion of the slide 28 is employed to connect a boundary portion 33 of the membrane member 6 thereto, and thus to also connect the membrane member 6 to the frame 8, through a plurality of circumferentially evenly spaced conventional fasteners. Such fasteners may be in the form of nuts and bolts. The fasteners and the associated apertures thereof are both generally denoted by the reference character 34.

In assembling the collector 2, the membrane member 6 is initially coupled to the frame 8 through the slide 28 by way of the fasteners 34 such that the membrane member 6 is held in plane. Thereafter, the membrane member 6 is uniformly and symmetrically stretched to provide the reflector surface 5 with a desired tension through the tensioning device 4.

To accomplish stretching the membrane member 6, the expander bladder members 22 are pressurized via the valves 36 thereof from a first diameter to a second larger diameter. As the bladders 22 expand, the inside surface 12 of the tongue 16 and the inside surface 24 of the piston 20 in contact therewith are subjected to the tension forces produced by the expanding bladders 22. In response to such expanding, the piston 20 is induced to move radially outwards relative to the frame 8 and is given intermittent movement by means of the tongues 16 engaging the teeth of the indexing means 32. As the slide 28 moves radially outward, each tongue 16 slides over the teeth thereof 32 in a manner to sequentially lockingly engage one tooth 32 at a time, and thereby index the radial movement of the piston 20. At the end of each indexing movement, the position of the slide 28 and thus the piston 20 is releasably locked by the teeth 32 so as to allow incremental and adjustable tensioning of the membrane 6, as will become more fully discussed hereinbelow.

Additionally, as the piston 20 is caused to move intermittently radially outward, the membrane 6 is submitted to the action of stretching forces applied at the boundary 33 thereof. Such stretching are forces parallel to a plane of the membrane 6 and are distributed uniformly over a thickness T thereof such that a stress distribution produced thereby is essentially solely plane. It is contemplated that the magnitudes of the tension induced in the membrane member 6 is in a range of from about 13,000 n/m (75 lb/in) to about 26,000 n/m (150 lb/in).

As a consequence of uniformly subjecting the piston 20 and the tongue 16 to the action of tension forces produced at the expander bladders 22, and as a consequence of holding the membrane 6 such that the stress distribution therein is plane, twisting moments that heretofore would act about the frame 8 during tensioning of the membrane 6 are substantially minimized. Because of the minimization of the twisting forces, it is contemplated that the frame 8 may be made with substantially thinner manufacturing material than heretofore used in the frame manufacture. It is further contemplated that these thinner frames will not be prone to fail when the membrane member 6 is under tension loading as predicted by skilled persons with the thicker prior art frames. For example, the thickness T of the frame 6 for all normally anticipated collector applications is in a range of from about 1 mm (0.040 in.) to 2 mm (0.080 in.).

It will be understood that the tensioning means 4 is also adapted to release or to adjust the tension in the membrane member 6 and thereby enable the focal length associated therewith to be controllable. To accomplish releasing the tension in the membrane 6, the pressure in the bladders 22 must be released while it is still seated within the recess 18, and the tongue 16 must be disengaged from the teeth 32. The pressure may be released through the valves 36. The tongues 16 may be disengaged from the teeth 32 by prying them in a radial direction towards the center 17 of the membrane member 6 such that the piston 20 is unlocked and is freely movable to a desired position.

In view of the aforesaid, it will now be appreciated that the collector 2 of the present invention has several advantages over earlier stretched membrane types in that: in collector manufacturing, the frame of the collector may be optimized from minimum weight within the desired design constraints regarding tensioning of the reflector surface because of the minimization of the twisting moments associated with tension loading; and the tensioning means enables the tension in the membrane member 6 to be adjustably varied, thereby providing collector 2 with the capability of having its focus or aimpoint adjusted to meet specific collector site requirements. The aimpoint of a collector concerns the target area to which the incident sun radiation is reflected.

The foregoing description of the preferred embodiments of the present invention has been presented for purposes of illustration and description. It is not intended to be exhaustive or to limit the invention to the precise form disclosed, and obviously many modifications and variations are possible in light of the above teaching. For example, a liner 38 may be disposed between each one of the two bladders 22 and the piston 20 to protect the bladders 22 from getting pinched or fractured by the teeth of the indexing means 32. Such a liner 38 could be formed from any number of plastic materials suitable for protecting bladder-type members, like for example, nylon webbing or vinyl plastics.

The foregoing is considered as illustrative only of the principles of the invention. Further, since numerous modifications and changes will readily occur to those skilled in the art, it is not desired to limit the invention to the exact construction and operations shown and described, and accordingly all suitable modifications and equivalents may be resorted to, falling within the scope of the appended claims.

The embodiments of the invention in which an exclusive property or privilege is claimed are defined as follows:

1. A solar concentrating collector comprising:
   (a) an elastic membrane member for concentrating sunlight;
   (b) a single frame member for holding said membrane member in plane and holding said membrane member in tension; and
   (c) tensioning means releasably connected to said membrane member for varying the tension of said membrane member, said tensioning means being disposed at said frame in a manner to only enable said tensioning means to be said connected to said membrane member, said tensioning means being adapted to uniformly and symmetrically incrementally subject said membrane member to stretching forces, such that stresses produced thereby are distributed uniformly over a thickness of said membrane member and reciprocal twisting moments are substantially prevented from acting about said frame, the connection between said tensioning means and said membrane member enabling deflection and movement of said frame member to be substantially limited while said membrane member is being subjected to said stretching forces.

2. A collector as recited in claim 1, wherein said tensioning means comprises:
   (a) a radially moveable piston means disposed at said frame for varying said tension of said membrane member; and
   (b) expander means disposed adjacent said frame and said tensioning means so as to impart intermittent radial movement to said piston means to effect increasing a tension in said membrane member in response to an expansion of said expander means.

3. A collector as recited in claim 2, wherein said frame comprises an annular shape, said frame having a pair of transversely spaced circumferentially extending tongue members for permitting motion of said piston relative to said frame in a first direction in order to effect increasing said tension of said membrane member.

4. A collector as recited in claim 3, wherein each one of said pair of tongues defines a circumferentially extending recess, and wherein said piston is adapted to seat within the two recesses defined by said tongue.

5. A collector as recited in claim 1, wherein said frame comprises an annularly-shaped substantially rigid material.

6. A collector as recited in claim 5, wherein a thickness of said frame is in a range of from about 1 mm to about 2 mm.

7. A collector as recited in claim 1, wherein said membrane is a resiliently elastic thin sheet-like metal material.

8. A collector as recited in claim 7, wherein said tension in said membrane member is a range of from about 35 kilograms per inch to about 70 kilograms per inch.

9. A collector as recited in claim 1, wherein said tensioning means is adapted to allow said tension to be incrementally decreased.

10. A solar concentrating collector comprising:
 (a) an elastic membrane member for concentrating sunlight;
 (b) a frame for holding said membrane in plane and holding said membrane member in tension;
 (c) tensioning means for varying the tension of said membrane member, said tensioning means being disposed at said frame, said tensioning means being adapted to releasably attach said membrane member to said frame and to uniformly and symmetrically incrementally subject said membrane member to stretching forces, such that stresses produced thereby are distributed uniformly over a thickness of said membrane member and reciprocal twisting moments are substantially prevented from acting about said frame, and wherein said tensioning means comprises:
  (1) a radially moveable piston means disposed at said frame for varying said tension of said membrane member; and
  (2) expander means disposed adjacent said frame and said tensioning means so as to impart intermittent radial movement to said piston means to effect increasing a tension in said membrane member in response to an expansion of said expander means, and wherein said frame comprises an annular shape, said frame having a pair of transversely spaced circumferentially extending tongue members for permitting motion of said piston relative to said frame in a first direction in order to effect increasing said tension of said membrane member, and wherein each one of said pair of tongues defines a circumferentially extending recess, and wherein said piston is adapted to seat within the two recesses defined by said tongue, and wherein said piston has a circumferentially extending platen portion and a circumferentially extending slide portion, said slide portion having a pair of opposed sides, said slide portion projecting radially inwards from said platen portion, said slide portion being adapted to said hold said membrane member in plane and in tension with a circumferentially extending radially inwardly facing peripheral edge portion thereof, and wherein each one of said opposed sides of said slide portion includes an indexing means for providing said piston with said outwardly radial movement to said effect increasing said tension.

11. A collector as recited in claim 10, wherein said expander comprises a pair of tubular-shaped expanding portions for effecting said outward radial movement of said piston, sand expanding portions being expandable from a first diameter defined by said tubular shape to a second larger diameter, each one of said expanding portions being disposed in a corresponding one of said two recesses so as to simultaneously abuttingly engage complementary portions of said tongue member and said platen, and wherein said two expanding portions cause said piston to move radially outward upon being expanded, and wherein said piston symmetrically and uniformly subjects said membrane member to stretching forces, when said piston moves radially outward in response to said expansion of said two expanding portions.

12. A collector as recited in claim 11, wherein said two tongues slidably engage corresponding ones of said indexing means in response to said expansion of said two expanding portions to effect said radially outward movement of said piston.

13. A collector as recited in claim 12, wherein each said indexing means comprises a plurality of spaced teeth, each said plurality of teeth being adapted to allow said slide portion to move radially outward relative to said two tongues in response to said expansion of said two expanding portions.

14. A collector as recited in claim 13, wherein said intermittent movement of said piston means enables said tension to be incrementally increased.

15. A method for fabricating a lightweight stretched membrane solar collector, said method comprising:
 a. forming an annular frame;
 b. connecting a tensioning member for uniformly and symmetrically stretching an elastic membrane member for concentrating sunlight to said membrane member;
 c. coupling said elastic membrane to said frame with said tensioning member such that said membrane member is held in plane and is held in tension; and
 d. uniformly and symmetrically subjecting said membrane member to stretching forces substantially solely with said tensioning member so as to uniformly distribute stresses produced by said stretching forces over a thickness defined by said membrane member and to substantially prevent reciprocal twisting forces from acting about said frame; and
 e. substantially preventing a deflection and movement of said frame by stretching said membrane member solely with said tensioning means.

* * * * *